United States Patent [19]

Altemose et al.

[11] Patent Number: 5,023,531
[45] Date of Patent: Jun. 11, 1991

[54] DUAL HYBRID DEMAND REFRIGERATION CONTROL APPARATUS

[75] Inventors: George A. Altemose, Stony Brook; Michael Consi, Deer Park; Edwin R. Joscelyn, Commack; William Wiemann, Wantagh, all of N.Y.; David B. Giguere, Palos Verdes Estates, Calif.; Wilfred J. Gully, Torrance, Calif.; Stanley E. Spencer, Palos Verdes Estates, Calif.

[73] Assignee: Arx, Inc., Plainview, N.Y.

[21] Appl. No.: 195,914

[22] Filed: May 19, 1988

[51] Int. Cl.$^5$ .................... H02P 6/02; G05D 23/00
[52] U.S. Cl. ........................ 318/471; 318/138; 318/254; 318/472
[58] Field of Search .............. 318/138, 254, 334, 439, 318/471, 472, 473, 599

[56] References Cited

U.S. PATENT DOCUMENTS

| | | | |
|---|---|---|---|
| 3,584,280 | 6/1971 | Inagaki | 318/138 X |
| 3,988,652 | 10/1976 | Endo et al. | 318/138 |
| 4,015,182 | 3/1977 | Erdman | 318/471 X |
| 4,418,303 | 11/1983 | Abe et al. | 318/254 |
| 4,472,666 | 9/1984 | Akeda et al. | 318/439 X |
| 4,510,422 | 4/1985 | Ogura | 318/254 |
| 4,544,868 | 10/1985 | Murty | 318/138 X |
| 4,595,865 | 6/1986 | Jahns | 318/138 X |
| 4,667,480 | 5/1987 | Bessler | 318/254 X |
| 4,686,437 | 8/1987 | Langley et al. | 318/254 |
| 4,694,228 | 9/1987 | Michaelis | 318/599 X |
| 4,720,663 | 1/1988 | Welch et al. | 318/254 |
| 4,734,628 | 3/1988 | Bench et al. | 318/599 X |
| 4,763,052 | 8/1988 | Lundin et al. | 318/599 X |
| 4,856,078 | 8/1989 | Konopka | 318/599 X |

*Primary Examiner*—Bentsu Ro
*Attorney, Agent, or Firm*—Wolder, Gross & Yavner

[57] ABSTRACT

A refrigeration control apparatus especially adapted for use in conjunction with cryogenic coolers includes a brushless variable speed drive motor for powering a mechanical cooler-compressor and electronic control circuitry coupled to the motor allowing motor speed and hence cooling rate to be responsive to changes in the temperature of the volume sought to be cooled. A signal corresponding to sensed temperature is compared to a reference signal derived from motor speed. The difference therebetween used to vary the duty cycle of a high frequency pulse train. The pulse train is used to modulate the drive current applied to the motor through pulse position switching circuitry to vary the speed of the drive motor. High and low motor speed limits are provided along with sensor failure protection circuitry to insure continuous motor operation between chosen limits.

19 Claims, 8 Drawing Sheets

FIG. 7

| STATE | HALL A | HALL B | HALL C | OUTPUT U4A | U4B | U4C | Q4 | Q5 | Q6 | U1A | U1B | U1C | Q1 | Q2 | Q3 | CURRENT FLOW |
|---|---|---|---|---|---|---|---|---|---|---|---|---|---|---|---|---|
| 1 | H | L | H | H | L | H | OFF | ON | OFF | L | L | H | OFF | OFF | ON | C-B |
| 2 | H | L | L | H | L | H | OFF | ON | OFF | H | L | L | ON | OFF | OFF | A-B |
| 3 | H | H | L | H | H | L | OFF | OFF | ON | H | L | L | ON | OFF | OFF | A-C |
| 4 | L | H | L | H | H | L | OFF | OFF | ON | L | H | L | OFF | ON | OFF | B-C |
| 5 | L | H | H | L | H | H | ON | OFF | OFF | L | H | L | OFF | ON | OFF | B-A |
| 6 | L | L | H | L | H | H | ON | OFF | OFF | L | L | H | OFF | OFF | ON | C-A |

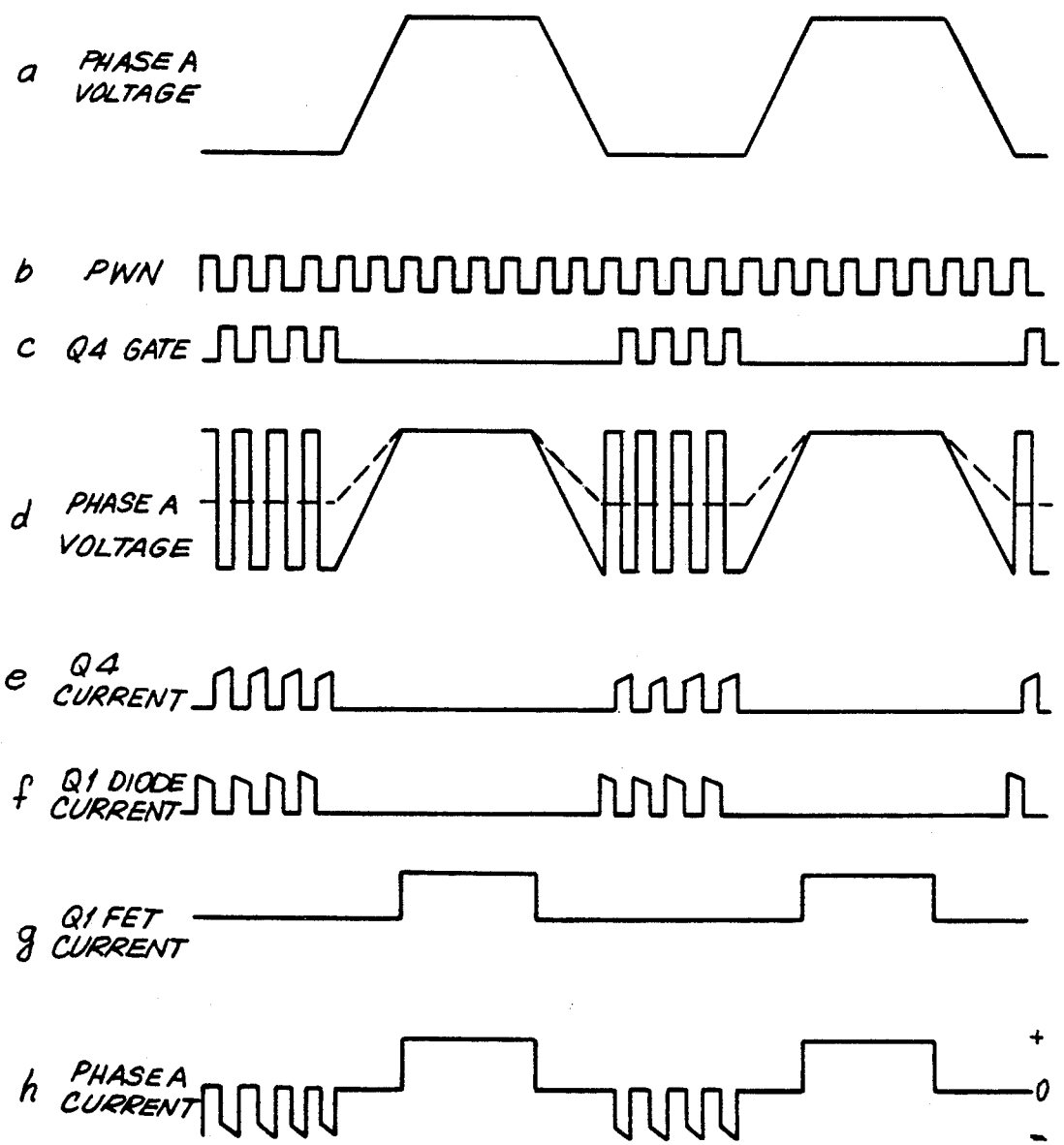

DUAL HYBRID DEMAND REFRIGERATION CONTROL APPARATUS

The present invention relates to an electrical refrigeration control apparatus and in particular such an apparatus incorporating a direct current polyphase electrical motor driver for a cryogenic compressor/cooler.

Very low temperature (cryogenic) systems are used for various purposes, and especially in military systems for cooling semiconductor chips and optical sensors used in laser range finders, chemical agent detectors, infrared detection and imaging systems, and the like. In such applications, a brushless multi-pole, multi-phase DC motor may be utilized to drive the compressor of the refrigeration system. For improved performance, it has been found that both the motor, as well as the drive circuitry therefor, can be located within a common pressurized housing along with the compressor. Such a configuration allows for the development of a compact unit, and lessens the amount of emitted electro-magnetic signals which can interfere with the operation of other apparatus, such as radio-receivers.

U.S. Pat. No. 4,366,49 of Dec. 22, 1981 to M. Schwartz discloses a refrigeration system in which a brushless DC motor and drive circuitry are enclosed within a common housing with the refrigeration compressor and associated components. The Schwartz apparatus, while providing a compact unit subject to substantially reduced electro-magnetic interference radiation, does not provide for active adjustment to motor speed, and consequently refrigeration temperature, on a continuous, real-time basis as may be required.

In particular, numerous sensors which are designed to operate at cryogenic temperatures have a specific and limited range of temperatures at which they exhibit optimum performance. As the units in which the sensors are mounted are subject to a wide variety of environmental conditions, a mechanism is required for the continuous monitoring of sensor temperature, and the control of the operation of the cooling system in response to temperature variations. In addition, as such systems are often located in environments, such as military vehicles, in which the electrical system voltage is subject to relatively wide variations and fluctuations, it is necessary to provide, as part of the control system for the cooling apparatus, appropriate safeguards to ensure that constant and consistent motor operation is achieved over a wide range of supply voltage conditions. Further, as the drive motor itself is subject to substantially reduced life and/or premature failure when run at extremely high or low speeds, control must be made to maintain motor operation within proper speed limits.

All of the above concerns must be attended to with the overall consideration that portions of the associated circuitry and, in particular, the temperature sensing portions thereof, operate at low current levels which make them particularly susceptible to induced currents from other, high-amperage circuitry, such as motor-switching circuits. In addition, electro-magnetic interference generated by the apparatus must be held to a minimum.

It is accordingly a purpose of the present invention to provide a cryogenic cooling control system and apparatus which maintains the temperature of the volume to be cooled within precise temperature limits.

Yet another purpose of the present invention is to provide a temperature control system which may accommodate itself to variations in supply voltage and which can maintain drive motor operation within provided speed limits.

Another purpose of the present invention is to provide a temperature control system which includes safeguards against temperature sense element failure.

Still a further purpose of the present invention is to provide such a temperature control system in which the above purposes are realized in an integral unit in which low and high current circuit elements are arranged in a manner to minimize interference and in which electromagnetic radiation emitted by the unit is minimized.

In accordance with the above and further objects, the present invention includes the combination of a polyphase DC motor and solid-state control system for driving a cooling compressor. The compressor provides cooling for a remote optical sensor or other device through a cold-finger arranged to be immersed in the housing for the sensor. A temperature-sensing device is also mounted within the refrigerated housing, a voltage signal developed thereby being used as a control mechanism for motor speed adjustment. In addition, circuitry is provided to monitor motor speed and compare such speed to desired upper and lower limits, as well as to control motor speed as required by the variations in sensed housing temperature. Failure sense circuitry is also provided for continuous cooling in the event of probe failure. In a further aspect of the invention, the circuitry, along with the motor and compressor, are all enclosed within a common housing, the circuit elements being disposed on a plurality of circuit-supporting elements such that unwanted interactions between the various circuit portions are minimized and circuit stability is enhanced.

A fuller understanding of the present invention will be apparent from the following description and accompanying drawings as applied to a preferred, but nonetheless illustrative, embodiment of the present invention.

BRIEF DESCRIPTION OF THE DRAWINGS

FIG. 7 is a chart of logic levels at certain points of the circuit at various times; and FIG. 8 including *a–h* are waveform diagrams for the current and voltage associated with a given stator phase winding.

DESCRIPTION OF A PREFERRED EMBODIMENT

Figure 1:
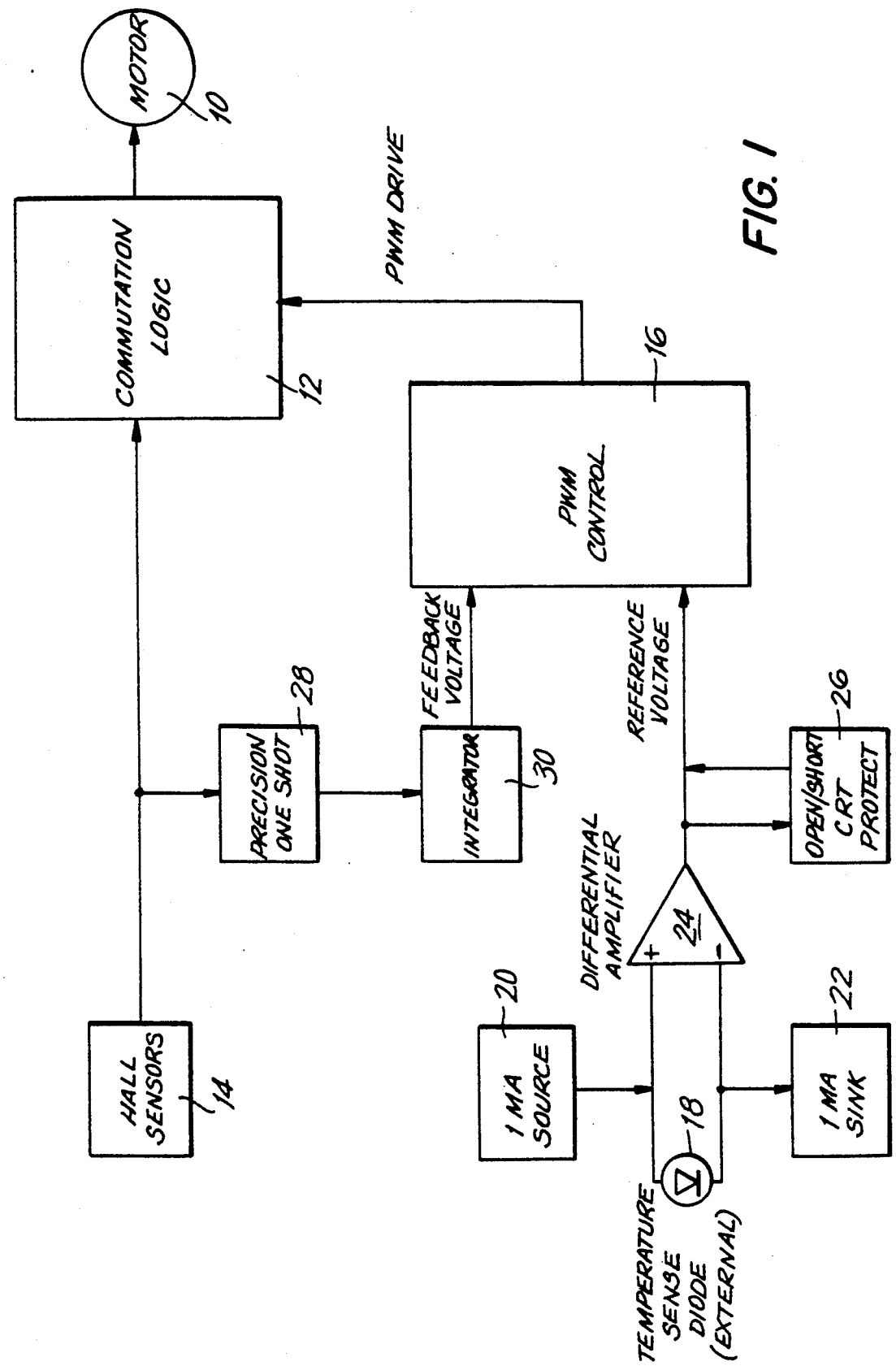
FIG. 1 is a block diagram of the motor control circuitry of the present invention.

Referring initially to FIG. 1, the circuitry of the present invention can be divided into several functional areas. Motor 10, which drives the refrigeration compressor, is of direct current, brushless design, preferably having an 8-pole rotor and multipole, 3-phase independently energizable stator windings, as exemplified by Model 16080-128 of Aeroflex Laboratories Incorporated. As used in the present invention, the operating speed of the motor is chosen to have an upper limit of 28.3 hz (1700 rpm) and a lower limit of 8.5 hz (510 rpm).

Voltage to motor 10 is applied through commutation logic 12, which directs a drive voltage, of the appropriate magnitude and sense, to the motor stator windings in the proper order to maintain the required rotational velocity. The timing of commutation logic 12 is triggered by Hall sensor circuitry 14, which is composed of three Hall effect sensors and associated components mounted in motor 10 in a manner known in the art to provide a pulse output whenever a rotor pole passes a sensor. The temporal spacing of such pulses is reflective of the speed of the rotor, as well as the positioning of the rotor poles as of the initiation of the pulses.

Pulse width modulation control (pwm) circuitry 16 creates a series of voltage pulses which are impressed upon the drive voltage applied by commutation logic 12 to the stator windings of the motor. By varying the duty-cycle of such pulses, the motor sees an effective DC voltage of variable amplitude, which directly controls motor speed.

The duty cycle of pwm control 16 is itself controlled by a reference voltage developed across temperature-sense diode 18, which is located within the container bearing the optical sensor array or other device whose temperature is to be monitored and maintained.

A control d.c. current of fixed amplitude is maintained through the temperature-sense diode 18 by high precision current source 20 and current sink 22. The varying voltage developed across the temperature-sense diode as a result of temperature variation is applied to differential amplifier circuitry 24, which in combination with open and short circuit protection circuitry 26, provides a reference voltage to pwm control 16 which varies within controlled limits. This reference voltage is compared to a feedback voltage, corresponding to motor speed, developed from the pulse train output of one of the Hall sensors 14 through one-shot multivibrator 28 and integrator 30. The resultant control signal is utilized by the pwm unit 16 to vary the duty cycle of the pwm output and thus vary motor speed as required.

Figure 3:
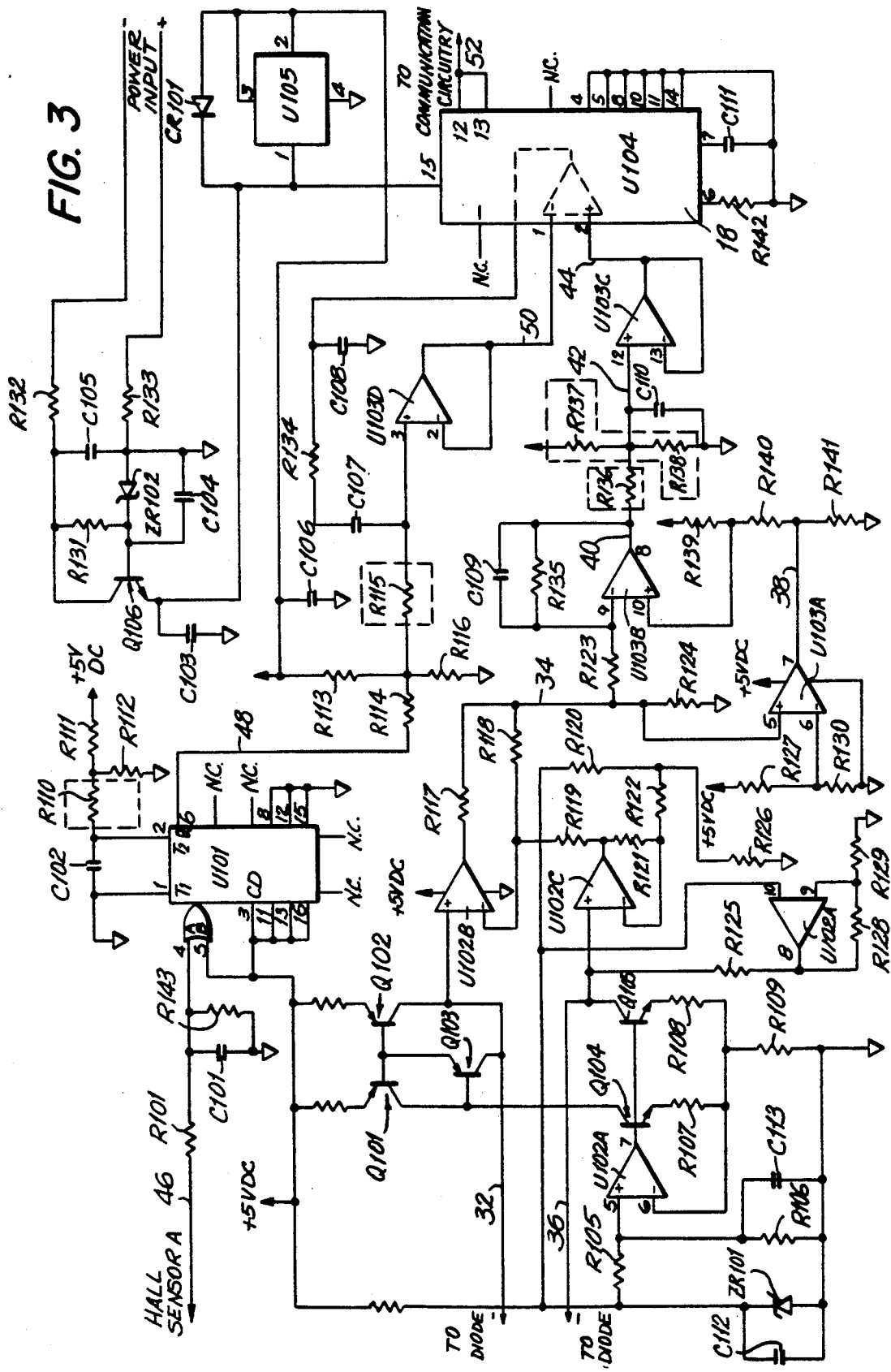
FIG. 3 is a schematic diagram of the temperature controller portion of the circuitry of the present invention.
Figure 4:
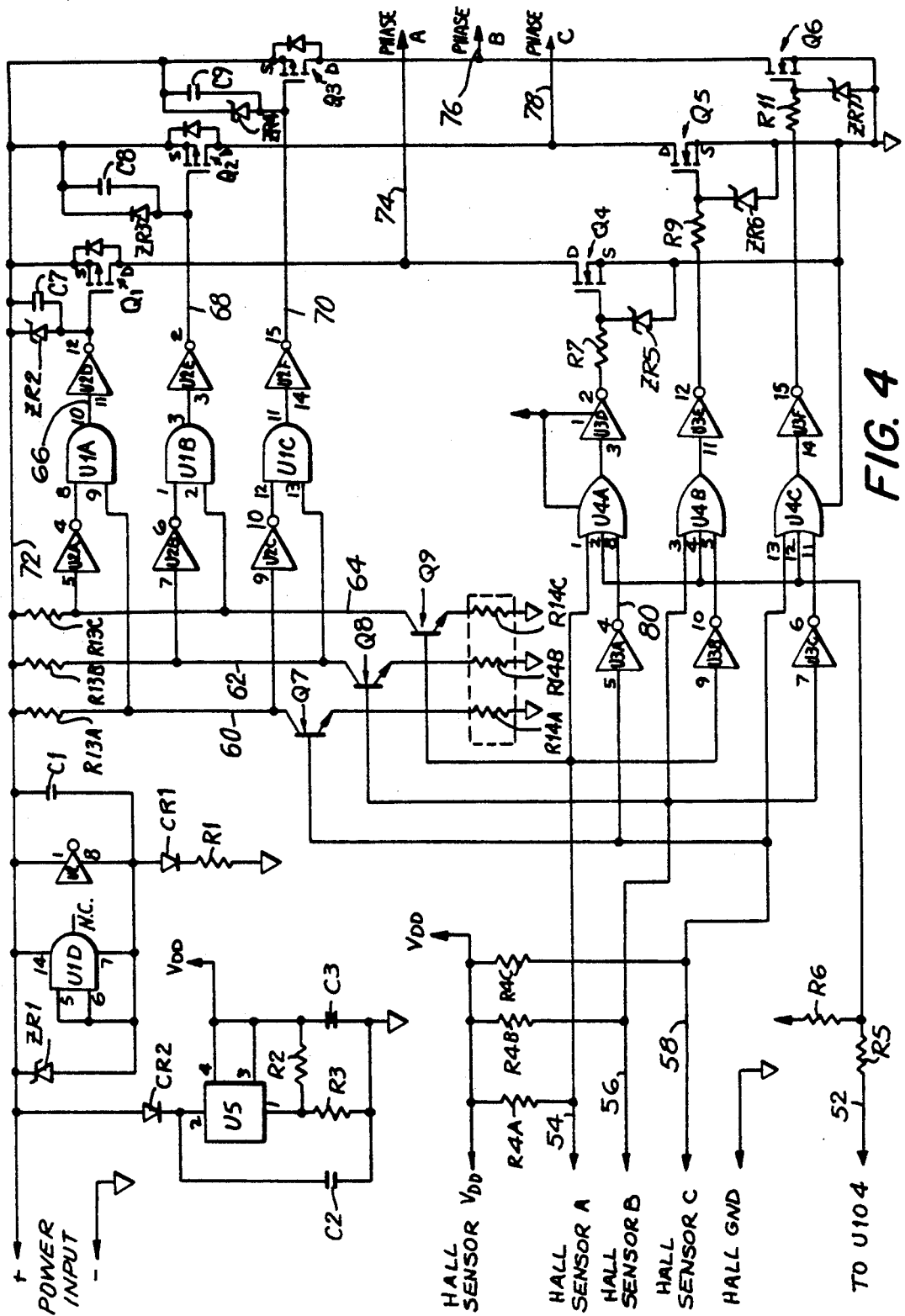
FIG. 4 is a schematic of the motor control portion of the circuitry of the present invention.

The functional attributes of the present apparatus as depicted in FIG. 1 may be achieved through the circuitry depicted in FIGS. 3 and 4. Referring first to FIG. 3, the circuitry depicted therein corresponds to pulse width modulation control unit 16 along with the necessary circuitry to provide the appropriate inputs thereto and output therefrom.

In particular, a positive one milliampere current is provided to temperature-sense diode 18 on line 32 by a current source/sink network comprising transistors Q101–Q105 and associated circuitry. Zener diode ZR101, in conjunction with voltage divider resistors R105 and R106, establishes a 0.5 volt reference voltage at pin 5 of integrated circuit U102A, which is configured as a voltage to current converter. Operating in a closed-loop mode, a 2 milliampere current is established through R109. As Q104 is a current mirror to Q105, equal 1 milliampere currents flow through the respective collector circuits.

The collector of Q104 is connected to the collector of Q101, and since Q102 is a current mirror to Q101, a 1 milliampere current is established in the Q102 collector circuit. This 1 milliampere reference current is applied by line 32 to temperature sense diode 18 and is maintained irrespective of supply voltage variations.

Preferably, a sense diode 18 having a −2 millivolt/degree Celsius temperature coefficient provides a suitable voltage variation over the range of certain temperatures normally expected and encountered for a sensor diode nominally at an operating temperature of 77 degrees Kelvin. At such a temperature sense diode output voltage of 1.06 volts is created. The diode may be a discrete component or a junction of a transistor. In particular, the base-emitter junction of a 2N2222 transistor has been found suitable.

The voltage produced by the application of the one milliampere reference current across temperature-sense diode 18 appears across lines 32, 36 and is applied to differential amplifiers U102-B and U101-C configured to provide isolation and buffering between the induced voltage and subsequent circuitry. The combination of buffers U102-B and C and the current source and sink configurations provide a single-ended voltage on line 34 of a nominal 2.5 volts level to ground during normal operation.

Figure 2:
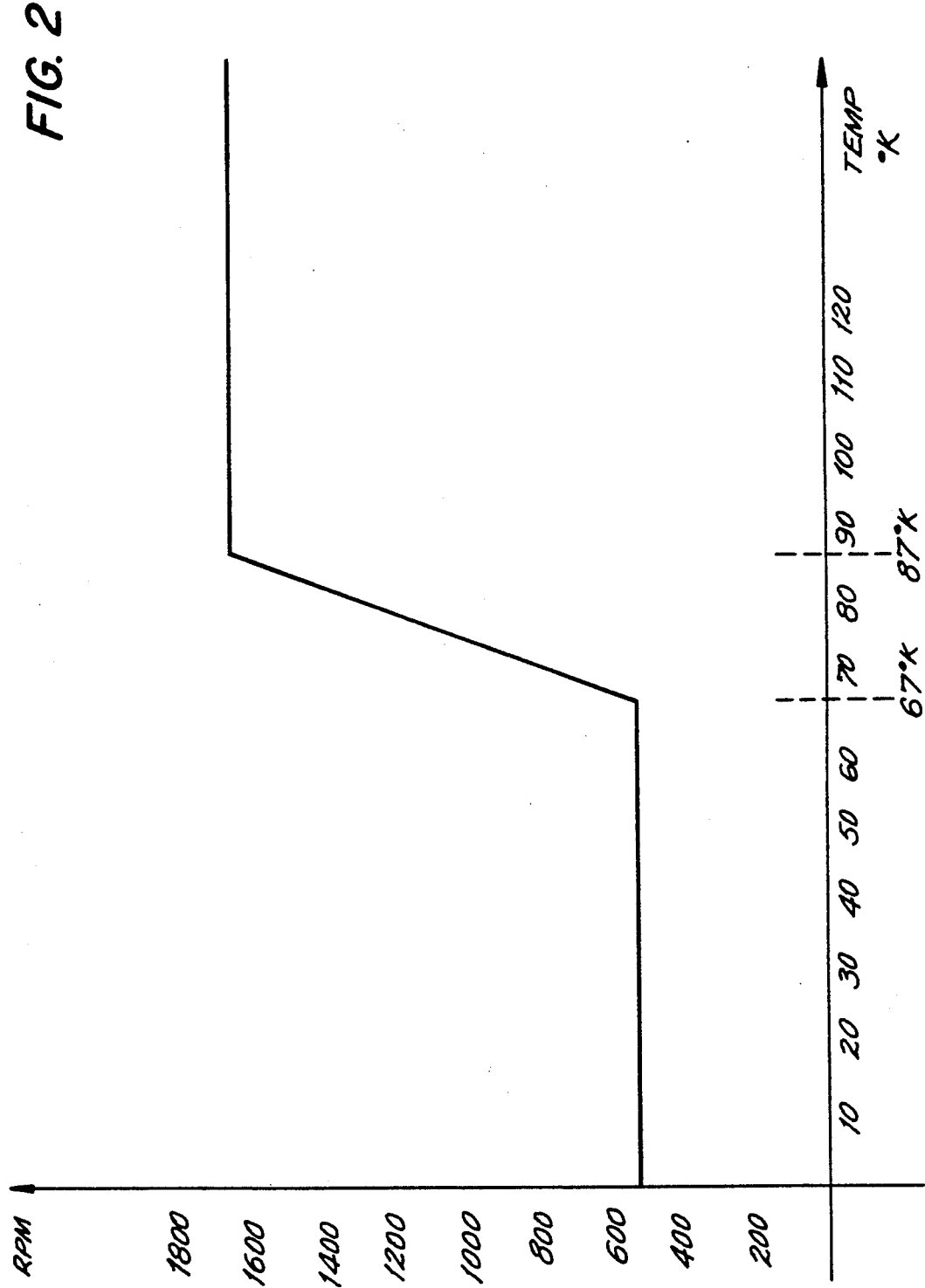
FIG. 2 is a graph depicting the relationship between motor speed and probe temperature.

As previously stated, motor 10 is intended to have a full speed of 1700 rpm and a low speed of 510 rpm. During normal system operation the circuitry provides for proportional control of motor speed between these limits as probe temperature varies between approximately 67 and 87 degrees Kelvin, as depicted in FIG. 2. Temperatures above 87 degrees K., such as upon system energization, keep the motor in the full-on mode, while temperatures below 67 degrees K., rather than slowing the motor into an undesired speed range, maintain the motor at the 510 rpm level.

In addition to providing motor control during proper operation, the present invention also incorporates failure mode circuitry to guard against catastrophic failure of the sense diode 18 or associated components, such as the leads thereto. In the event of a diode short, the voltage on lines 32, 36 goes to zero, which simulates a high temperature condition which is handled by the control circuitry in the normal manner, placing the motor into the full-on mode. In the event of a diode open, creating a 5 volt condition across lines 32, 36, the failure sense circuitry overrides normal operation, and again places the motor in the full-on mode to insure that the cold finger remains cold. Due to inherent losses in the sensor housing, continuous cooling of the housing is less detrimental to system operation than a loss of cooling, as cooling loss can result in an unlimited temperature rise.

Determination of such a low out-of-range condition and response thereto is provided by the circuitry of U103A and U103B. The voltage on line 34 is applied to comparator U103A, which compares that voltage to a positive 4.09 volt reference voltage developed by resistive voltage divider R127/R130 across its subtractive input terminal. The output of comparator U103A on line 38 is thus either at ground, when the 4.09 volt reference voltage exceeds the diode output voltage, or at a five-volt output, representing comparator saturation, when the diode output voltage exceeds 4.09 volts. During normal operation 2.5 volts, created by the voltage divider action of R139, R140 is thus applied to U103B pin 10. The difference between this voltage and the nominal 2.5 volt diode sense voltage on line 34 drives operational amplifier U103B, which is configured as an inverting feedback differential amplifier with a gain factor of approximately 240. This gain represents a balance between high gain, which is required for system sensitivity, and system stability, which is lessened as gain is increased.

Operational amplifier U103B, during normal operation, provides a voltage on line 40 which varies between 0 and 5 volts, The zero level corresponding to a "too cold" diode condition (less than 67 degrees K.) and a desired low motor speed of 510 rpm, the 5-volt level corresponding to a "too hot" diode condition (above 87 degrees K.) and a desired "full-on" motor speed of 1700 rpm. This output signal is passed through a voltage divider network of R136–R138, which shifts and compresses its range to 2 to 3 volts, the two-volt level corresponding to the minimum speed desired and the three-volt level corresponding to full motor speed. This voltage is fed on line 42 to buffer U103C and is applied to pwm circuit U104 on line 44.

When the output of U103A is high, corresponding to a diode open, pin 10 of U103B goes to the high, 5 volt level. Due to circuit constraints, the voltage on line 34 in the high or diode open condition cannot fully reach 5 volts, so the difference between the 5 volt input on pin 10 and the voltage on pin 9 drives U103B's output pin 8 high, thus producing a "full-on" reference voltage to pwm circuit U104 in an open-type failure situation.

The voltage on line 44, derived from the temperature of reference diode 18, (with the appropriate failure protection limits) must be compared to an appropriate reference voltage derived from the motor speed in order to effect proper motor control. Accordingly, the output of one of the Hall sensors, which is a variable length pulse train of 50% duty cycle whose frequency and pulse length are both dependent upon the speed of the motor, is taken on line 46 and conditioned by monostable multivibrator U101 and appropriate associated circuitry to yield a train of fixed-duration pulses, the frequency of which corresponds to the frequency of the pulses created by the Hall sensor and whose length is controlled by the combination of C102 and R110. The output pulses from multivibrator U101 on line 48 are level and amplitude shifted by the voltage divider comprising R113, R114 and R116, and are passed through isolation buffer U103D. The output of buffer U103D on line 50 is applied to pwm circuitry 18 (U104) to be compared with the temperature-derived reference voltage on pwm input line 44. Pwm U104 includes an internal integrator, which is used to convert the pulse train on line 50 to a corresponding DC voltage. The time constant for the integrator is determined by R115 and C107, whose values are chosen to provide a time constant substantially greater than the period of the pulses on line 50 to be integrated. With such a difference, the specific values chosen for R115 and C107 are of minor importance. The corresponding DC level produced by the internal integrator is thus controlled by the R113, R114, R116 voltage divider, whose values are chosen to yield the appropriate speed range when compared by U103 to the 2-3 volt input from the temperature sensor circuitry.

As shown, U104 is a commercially available integrated circuit which compares the signals on input lines 44 and 50 to produce an output pulse train on line 52 whose duty-cycle is dependent upon the difference between the effective DC voltages on lines 44 and 50. The combination of R142 and C111 determine the frequency of the pwm output, and are chosen to provide a nominal frequency of 95 kilohertz. As the duty cycle of the output varies, its effective DC level similarly is varied, thus allowing the output pulse train of pwm U104 to be used to establish the effective DC voltage level of the drive current for motor 10. For a motor voltage in the 18 to 30 volt range, the duty cycle of U104 will range from approximately 17 to 95 percent.

Power for the temperature sense and pwm circuitry of FIG. 3 is controlled by voltage regulator U105, which provides a constant 5 volt potential with respect to ground over a range of supply voltages. Transistor Q106, in conjunction with 22-volt zener diode ZR102, provides over-voltage protection.

Reference is next made to FIG. 4, which discloses the motor drive circuitry of the present invention.

The stator windings of the motor 10 are connected in a wye configuration. Thus, for proper commutation and rotor rotation, a current path must be established through 2 of the 3 stator winding phases. In particular, a current phase sequence of AB, AC, BC, BA, CA, CB must be established. This is accomplished by appropriate switching of field-effect transistors Q1 through Q6. Transistors Q1 through Q3, when turned on, apply a positive potential to the free ends of windings A through C, respectively, while transistors Q4 through Q6, when turned on, ground the respective phase winding ends. It is the combined switching of transistors Q1–Q3 and Q4–Q6 which direct motor current through the stator windings as required.

Figure 6:
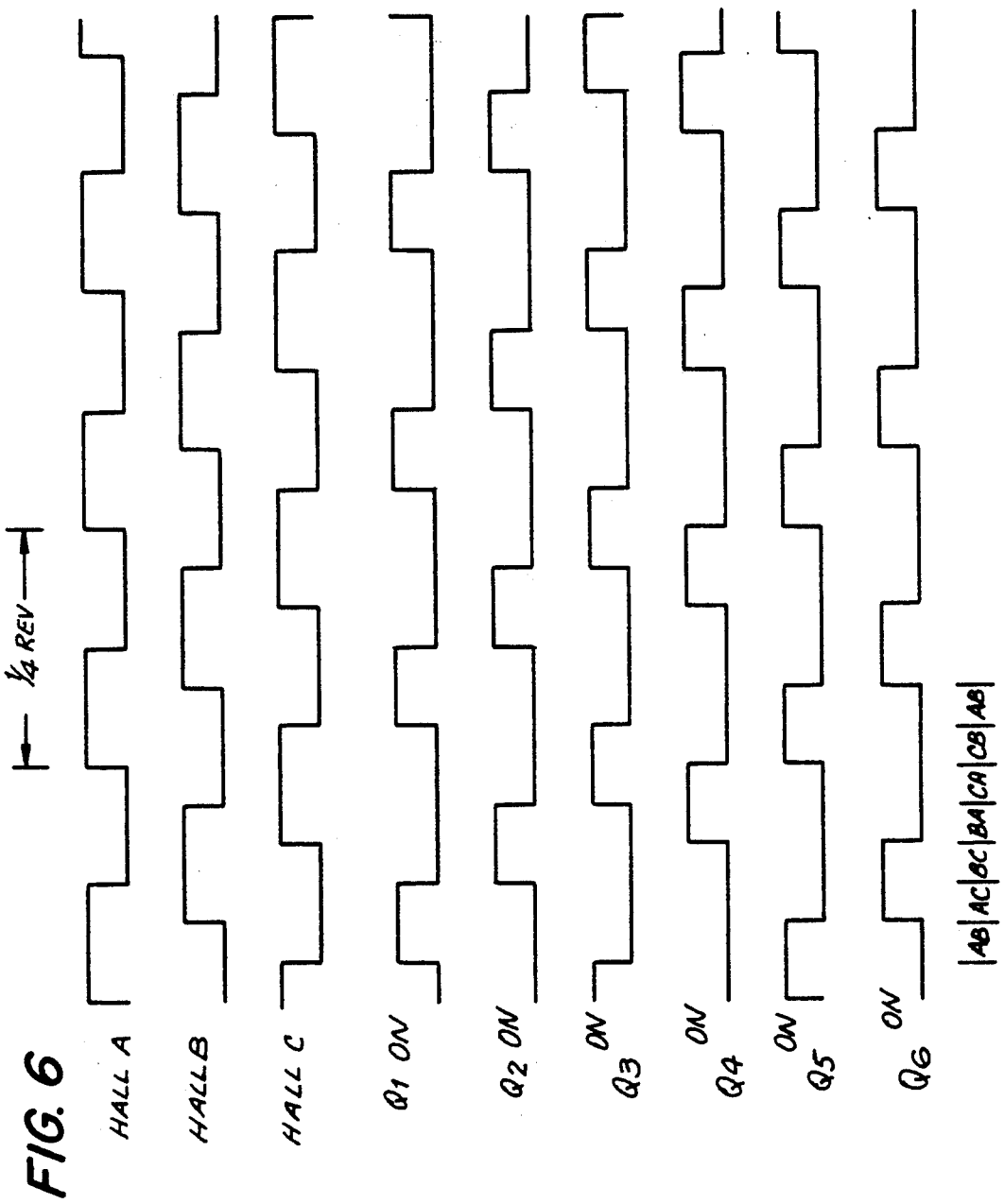
FIG. 6 is a group of logic diagrams depicting the switching order of the present circuitry.

Turn-on of transistors Q1 through Q6 is directed by timing pulses generated from the Hall effect devices. As shown in FIG. 6, the Hall effect devices for each of phase A, B and C are each switched on sequentially for one-eighth of a physical revolution of the rotor four times per revolution, with a 30 degree shift between phases. To develop proper commutation, upper transistors Q1–Q3 are turned on only during the periods of time shown in the middle portion of FIG. 6. For example, transistor Q1, which controls the energization of phase A, is to be turned on only when Hall effect sensor A is energized and Hall sensor C is not. Similar logic is developed for transistors Q2 and Q3 controlling phases B and C, respectively.

Such switching is developed by the logic circuitry of FIG. 4. In particular, with respect to the energization of Q1, the output of Hall sensors A and C on lines 54 and 58, respectively, are sensed by switching transistors Q9 and Q7. When the respective lines 54,58 are high, the transistor switch is on, at which time line 64 or 60, connected to the collector of the respective transistor, goes low. With respect to Q1, invertor U2A provides a high level input to "and" gate U1A when Hall A sensor line 54 is high, while line 60, connected directly to the collector of Q7, provides a high input when Hall sensor C line 58 is low.

Thus, the output of gate U1-A is high only when the output of Hall sensor A is high (energized) and the output of Hall sensor C is not. That output, on line 66, is applied to invertor U2D and then to the gate of Q1. As Q1 is a p-channel FET, it turns on only when its gate is approximately 10 volts negative with respect to its source. As the source of Q1 is connected to positive voltage buss 72, Q1 is turned on only when the output of invertor U2D is low. Thus Q1 is on, applying a positive potential to phase winding A on line 74, only during the period when Hall device A is high and Hall device C is low.

In a similar manner, transistors Q2 and Q3 provide potential to phases B and C on lines 76, 78 respectively, only when Hall device B output is high and Hall device output A is low (Q2 on) or when Hall device output C is high and Hall device B output is low (Q3 on).

To provide a low end for the current path through the stator windings, the appropriate winding must be grounded. When Q1 is high, energizing phase A, for example, grounding must switch between phases B and C to provide the complete AB, AC current paths. This is accomplished by the energization of transistors Q4 through Q6 by their associated logic.

Again, with respect to phase A, that winding is grounded only when the phase B or C winding is provided with a positive potential, and then only during the proper portion thereof, as shown in FIG. 6, to insure commutation in the correct sense. Thus, referring again to FIG. 4, the output of Hall sensor A on line 54 is provided to "or" gate U4A, along with a signal on line 80 indicating the inverse of the status of Hall sensor C. Disregarding for the moment the third input to gate U4A, which is the output signal from pwm circuit 18 (U104), "or" gate U4 turns on when either Hall device A is energized or Hall device C is not. This high output is inverted by invertor U3D, which is then applied to the gate of n-channel field-effect transistor Q4. As an n-channel FET turns on when its gate potential is approximately 10 volts positive with respect to its source, and as the source of Q4 is at ground potential, Q4 turns on whenever the output of invertor U3A is high. As this occurs only when the output of Hall device A is low and the output of Hall device C is high, line 74 to the phase A windings is dropped to ground potential only upon that occurrence.

Analogous switching occurs with respect to transistors Q5 and Q6, causing the respective phase windings to be grounded in a proper sequence to direct stator current through the windings in the proper order and with the proper timing. A summary of the logic at particular points in the switching circuitry is shown in FIG. 7.

A positive potential is provided for the Q1-Q3 logic circuitry across 10-volt zener diode ZR1 connected to buss line 72. The 10-volt potential to U1 and U2, therefore, is developed with reference to the positive side of the power source. The potential for the logic circuitry associated with Q4-Q6, however, is created by regulator U5 and associated components, and is derived with reference to the negative side of the power source. This dual arrangement allows for proper reference of the transistor Q1-Q6 gate signals with respect to source potentials.

As seen in FIG. 4, the output of pwm 18 on line 52 is applied to each of the "or" gates U4A-U4C operatively connected to transistors Q4-Q6. The result of the application of pwm output to the "or" gates is to modulate the gate control signals applied to Q4 through Q6 at the 95 kilohertz rate of the pwm output, as shown in FIG. 8C with regard to Q4. Thus, rather than being on for a continuous period of time, each of Q4 through Q6 is cycled on and off, the percentage of on-time corresponding to the duty cycle of the pwm output. FIG. 8 depicts the current flows and potentials relating to phase A during switching operation. FIG. 8a shows that, rather than having a rectangular wave form, the unmodulated voltage of phase A on line 74 would be trapezoidal, representing back emf effects of the windings.

During the time the potential is zero, corresponding to Q4 on time, pwm U104 modulates the Q4 gate, as shown in FIGS. 8b and 8c. The potential of phase A thus shifts between zero and the nominal source potential, the percentage of "off" time being controlled by the duty cycle of pwm output. Thus the "effective" voltage seen by phase A is a function of the pwm duty cycle, as represented by the dashed lines in FIG. 8d. The 24-volt value is established by the back EMF of the windings and, as shown in FIG. 8e, is developed and dissipated through the internal diode of Q1.

It is to be appreciated that whenever the voltage shown in FIG. 8a is 24 volts, Q1 is on, thus providing for the positive Q1 current flow shown (without pwm modulation effects) in FIG. 8g. As a result of the switching logic, however, the current flow through phase A, as shown in FIG. 8h, varies in direction as the phase order varies as shown in FIG. 6. Note again that actual pwm modulation is not shown during the positive going current flow.

Figure 5:
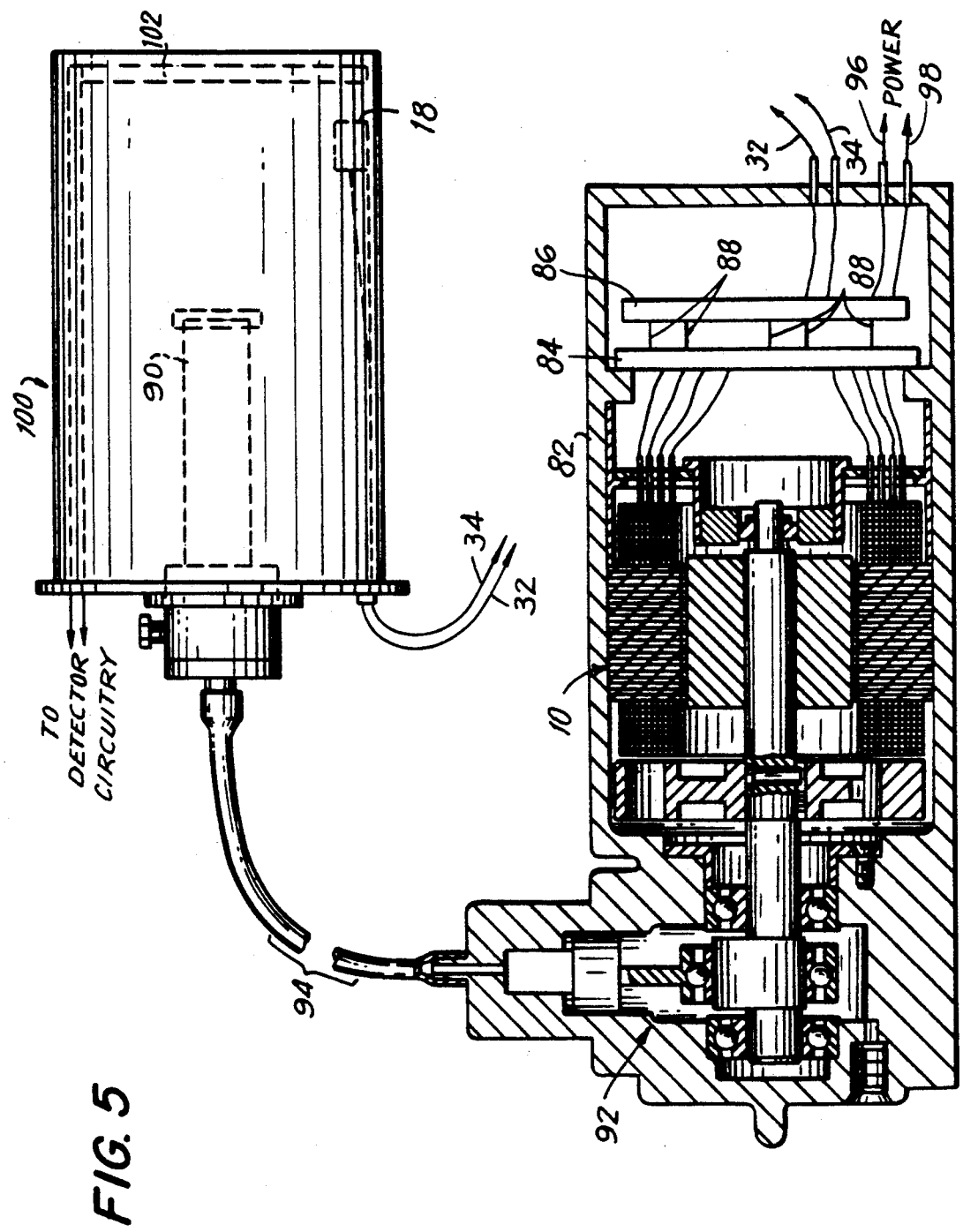
FIG. 5 is a representation of the placement and orientation of the major elements of the cooling apparatus.

As may be seen in FIG. 5, the circuits previously discussed may be advantageously mounted within a pump enclosure 82 on a pair of insulating circuit boards 84 and 86. The circuitry of FIG. 4 may be advantageously mounted on board 84, while the circuitry of FIG. 5 is mounted on parallel board 86. Leads 88 provide for the necessary electrical interfaces between the boards and also provide the means by which the boards are spaced from each other. In this manner, only a relatively small number of connections need be made to external components. Cold finger 90 is connected to the output of compressor 92 driven by motor 10 by refrigerant line 94. Diode 18 in Dewar flask 100 bearing optical sensor 102 array is connected to the circuitry by lines 32, 34, while power is supplied to the unit by the power lines 96, 98. Dewar flask 100 may be part of a cryogenic cooler system, model 16080-128, of Hughes Aircraft Co.

The components of the present invention may preferably have the following values. The resistors shown with a * should be trimmed to a specific value with the circuit operating. By the use of known thick and thin film technology, such components may be assembled in a highly compact manner advantageous to weight and size reduction.

| R1 | 4K ohms | *R107 | 100 |
|---|---|---|---|
| R2 | 240 | *R108 | 100 |
| R3 | 1680 | R109 | 250 |
| R4 A-C | 10K | R110 | 450K |
| R5 | 270 | *R111 | 1K |
| R6 | 5.1K | *R112 | 4K |
| R7 | 50 | R113 | 103K |
|  |  | R114 | 100K |
| R9 | 50 | R115 | 5 Meg |
|  |  | R116 | 88K |
| R11 | 50 | R117 | 250 |
|  |  | R118 | 1K |
| R13 A-C | 10K | R119 | 1K |
| R14 A-C | 10K | R120 | 1.5K |
| R101 | 10K | R121 | 1K |
| R102 | 2K | R122 | 400 |
| R103 | 100 | R123 | 1K |
| R104 | 100 | R124 | 20K |
| *R105 | 3K | R125 | 20K |
| *R106 | 2K | R126 | 1K |
| R127 | 1K |  |  |
| R128 | 600 |  |  |
| R129 | 1K |  |  |
| R130 | 4.5K |  |  |
| R131 | 5K |  |  |
| R132 | 100 |  |  |
| R133 | 50 |  |  |
| R134 | 10K |  |  |
| R135 | 60K |  |  |
| R136 | 1 Meg |  |  |

-continued

| | | | | |
|---|---|---|---|---|
| R137 | 500K | | | |
| R138 | 500K | | | |
| *R139 | 30K | | | |
| *R140 | 30K | | | |
| R141 | 10K | | | |
| R142 | 10.46K | | | |
| U1 | 4081 | Q1-Q3 | PCF25PO8 | |
| U2 | 4049 | Q4-Q6 | PCF18NO8 | |
| U3 | 4049 | Q7-Q9 | 2N2222A | |
| U4 | 4075 | Q101-103 | 2N2907 | (Q101, Q102 adjacent dies) |
| U5 | LM117 | | | |
| U101 | 4538 | Q104-105 | 2N2222 | (Q104, Q105 adjacent dies) |
| U102 | 7641 | | | |
| U103 | 7641 | Q106 | 2N3767 | |
| U104 | 1524A | CR1, CR2, | CR101 | 1N4148 |
| U105 | LM340 | | | |
| C1-C3 | .1 mfd | C109 | | .001 |
| | | C110 | | .1 |
| C7-C9 | .01 | C111 | | .001 |
| C101 | .001 | C112-C113 | | .01 |
| C102 | .01 | | | |
| C103 | .047 | ZR1 | | 1N961A |
| C104-C105 | .1 | ZR2 | | 1N965 |
| C106 | .047 | ZR101 | | LM113 |
| C107 | .1 | ZR102 | | 1N4115 |
| C108 | .01 | | | |

It is to be appreciated that by virtue of the present invention, precise control of the temperature of optical array 102 or similar devices may be obtained over a wide range of operating temperatures and supply voltages. Numerous modifications, adaptations and changes to the invention as set forth herein may be practiced by one skilled in the art and accordingly the scope of protection sought herefor is to be measured by the annexed claims.

We claim:

1. A temperature regulating apparatus comprising:
a brushless variable speed drive motor coupled to a cooling compressor adapted to cool a location remote from said drive motor, said drive motor including a permanent magnet rotor, a multipole stator and a stator armature with separably energizable windings for successive stator poles;
a temperature sensor at said remote location, said temperature sensor including an element whose resistance varies with the temperature thereof;
means for sensing predetermined angular positions of said rotor;
a motor control network including means for producing a first signal derived from the voltage across said temperature sensor, means for producing a second signal in response to the angular speed of said rotor, and means for feeding a constant current through said resistance varying element;
a compensation network for adjusting the response of said motor control network to the output of said temperature sensor;
means for producing a relatively high frequency pulse signal with a pulse width duty cycle being modulated in response to a predetermined relationship of said first and second signals; and
a commutation network responsive to said rotor position sensing means for energizing said pole windings in a predetermined phase relationship to the position of said rotor and at a level responsive to said high frequency pulse signal, whereby the energization of said armature is responsive to said predetermined relationship of said first and second signals.

2. The apparatus of claim 1, wherein said constant current feeding means includes a current feeding regulated constant current source and a current sink respectively connected to opposite ends of said resistance varying element.

3. The apparatus of claim 2, wherein said resistance varying element is a diode junction having opposed electrodes connected to said current source and current sink respectively.

4. The apparatus of claim 1, wherein said motor control network includes a differential amplifier, a voltage varying with said voltage across said resistance varying element being applied across the input of said differential amplifier, the output of said differential amplifier, defining said first signal.

5. The apparatus of claim 4, wherein said motor control network further includes high and low motor speed set point control means.

6. The apparatus of claim 5, wherein said set point control means include differential amplifier comprising means.

7. The apparatus of claim 5, wherein said motor control network further includes short and open circuit protection means for said temperature sensor.

8. The apparatus of claim 7, wherein said short circuit protection means comprises said high motor speed set point control means and said open circuit protection means comprises said low motor speed set point control means.

9. The apparatus of claim 1, wherein said rotor position sensing means includes a plurality of rotor position sensing elements regularly angularly spaced about and proximate to said rotor and means responsive to said rotor position sensing elements for producing rotor position signals in accordance with predetermined angular positions of said rotor, said commutation network comprising means for energizing the respective stator pole windings in response to concurrent rotor position signals and individual pulses of said high frequency pulse signal.

10. The apparatus of claim 9, wherein said rotor position sensing element includes means for producing a train of pulses, the start point of each pulse thereof representing a predetermined angular position of said rotor.

11. The apparatus of claim 10, wherein said rotor position sensing elements comprise Hall effect magnetic field sensors.

12. The apparatus of claim 9, wherein said second signal producing means includes means for producing said second signal in response to the frequency of the rotor position signals of one of said rotor position sensing elements.

13. The apparatus of claim 1 including a sealed casing, said motor, said cooling compressor and said motor control network and said commutation network being enclosed in said casing.

14. The apparatus of claim 1, wherein the pulses of said high frequency pulse signal are of substantially rectangular configuration.

15. A motor driven temperature regulated cooling apparatus comprising:
means including a remote temperature sensor for producing a temperature responsive signal, said temperature sensor being located at a position remote from the motor drive portion of the cooling apparatus;

a brushless variable speed DC drive motor including a permanent magnet rotor and a multipole stator having Y-connected pole windings with first, second and third winding terminals;

means responsive to predetermined successive positions of said rotor for producing respective first, second and third position signals;

a compensation network for producing a direct current electrical signal output derived from one of said position signals and said temperature responsive signal;

a voltage power supply having opposite first and second power terminals;

an intermittent pulse generator for producing an intermittent pulse signal of a variable width responsive to the output of said compensation network;

three pairs of first and second semiconductor switches having control electrodes, each of said Y-connected winding terminals being connected through a respective first semiconductor switch to said power supply first power terminal and through a respective second semiconductor switch to said power supply second power terminal; and a logic circuit network responsive to said position signals for applying commutation and control signals to said semiconductor switch control electrodes to successively alternately connect pairs of said winding terminals in six successively different permutations to said power supply power terminals in synchronism with the rotation of said motor and responsive to said intermittent pulse signal to modulate the current through said windings, said logic circuit network comprising three "and" gates having outputs connected to the respective first semiconductor switch control electrodes, three "or" gates having outputs connected to the respective second semiconductor switch control electrodes, different position signals in direct and inverted states being coupled to inputs of respective "and" and "or" gates in different combinations whereby to commutate said first and second semiconductor switch control electrodes in said permutation sequence.

16. The apparatus of claim 15, wherein said intermittent pulse signal is coupled to the inputs of each of said "or" gates.

17. The apparatus of claim 15, including means for producing a signal responsive to the rotational speed of said rotor, said intermittent pulse signal pulse width being responsive to a predetermined relationship of said rotor speed signal and said temperature responsive signal.

18. The apparatus of claim 15, including a diode connected across the output of each of said first semiconductor switches.

19. A closed-loop cooling apparatus, comprising:

a brushless DC motor coupled to a cooling compressor having a cold finger said cold finger located at a remote location to be cooled;

a temperature sensor located at said remote location for generating an electrical signal responsive to the temperature of said remote location;

means coupled to said temperature sensor for producing a first electrical signal derived from said temperature sensor electrical signal, said first electrical signal producing means including a compression network coupled to said temperature sensor to match the operational characteristics of said motor to said temperature sensor-generated electrical signal and open and short circuit temperature sensor condition control means, the output of said first electrical signal producing means being between pre-established upper and lower voltage limits, said control means comprising means for placing the output of said first electrical signal producing means at said upper or lower voltage limit upon sensing of the short or open condition of said temperature sensor respectively;

means for producing a second electrical signal responsive to the speed of said motor; and a motor control network for providing a motor energization current responsive to said first and second electrical signals whereby the speed of said motor is varied between chosen high and low speed limits proportional to said upper and lower voltage limits to control the output of said cooling compressor to maintain said remote location at a predetermined temperature.

* * * * *